(12) United States Patent
Naik et al.

(10) Patent No.: US 12,245,136 B2
(45) Date of Patent: Mar. 4, 2025

(54) METHODS, APPARATUSES, AND SYSTEMS FOR MANAGING NETWORK COMMUNICATIONS

(71) Applicant: Comcast Cable Communications, LLC, Philadelphia, PA (US)

(72) Inventors: Gaurav Naik, Philadelphia, PA (US); David Luksenberg, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 347 days.

(21) Appl. No.: 17/682,741

(22) Filed: Feb. 28, 2022

(65) Prior Publication Data

US 2022/0279428 A1 Sep. 1, 2022

Related U.S. Application Data

(60) Provisional application No. 63/154,311, filed on Feb. 26, 2021.

(51) Int. Cl.
*H04W 4/00* (2018.01)
*H04W 4/80* (2018.01)
*H04W 48/16* (2009.01)

(52) U.S. Cl.
CPC ............ *H04W 48/16* (2013.01); *H04W 4/80* (2018.02)

(58) Field of Classification Search
CPC ................................ H04W 48/16; H04W 4/80
USPC ........................................................ 370/329
See application file for complete search history.

(56) References Cited

U.S. PATENT DOCUMENTS

| | | | |
|---|---|---|---|
| 9,398,437 B2 | 7/2016 | Kasslin et al. | |
| 10,805,861 B2* | 10/2020 | Breaux, III | G06F 3/0227 |
| 11,284,334 B2* | 3/2022 | Breaux, III | H04W 76/14 |
| 2006/0187858 A1* | 8/2006 | Kenichi | H04W 48/16 |
| | | | 370/254 |
| 2013/0067094 A1* | 3/2013 | Madhusudan | G06F 3/1236 |
| | | | 709/227 |
| 2014/0254466 A1 | 9/2014 | Wurster et al. | |
| 2017/0223615 A1 | 8/2017 | Lee et al. | |
| 2019/0075607 A1* | 3/2019 | Park | H04W 76/14 |
| 2019/0090252 A1* | 3/2019 | Park | H04L 67/141 |
| 2019/0141786 A1* | 5/2019 | Park | H04W 4/80 |
| 2019/0182749 A1* | 6/2019 | Breaux | H04W 4/027 |
| 2020/0097665 A1 | 3/2020 | Mahaffey | |
| 2021/0337460 A1* | 10/2021 | Breaux, III | H04W 8/18 |
| 2023/0144943 A1* | 5/2023 | Ong | H04W 72/542 |
| | | | 455/522 |
| 2023/0156569 A1* | 5/2023 | Breaux, III | H04W 12/08 |
| | | | 381/86 |
| 2023/0156570 A1* | 5/2023 | Breaux, III | H04W 4/80 |
| | | | 381/86 |

* cited by examiner

*Primary Examiner* — Marceau Milord
(74) *Attorney, Agent, or Firm* — Ballard Spahr LLP (57) ABSTRACT

Methods, apparatuses, and systems for wireless communication are described. One or more peripheral devices may transmit a discovery beacon. The discovery beacon may indicate a first device state associated with the one or more peripheral devices. The discovery beacon may be received by one or more network devices. The one or more network devices may determine, based on the discovery beacon, a second device state associated with the one or more peripheral devices.

25 Claims, 8 Drawing Sheets

- 410 SEND ONE OR MORE FIRST MESSAGES
- 420 RECEIVE ONE OR MORE RESPONSES
- 430 DETERMINE FIRST DEVICE IDENTIFIER AND FIRST DEVICE STATE AND SECOND DEVICE IDENTIFIER AND SECOND DEVICE STATE
- 440 TERMINATE SENDING ONE OR MORE MESSAGES
- 450 SEND ONE OR MORE SECOND MESSAGES

FIG. 8

METHODS, APPARATUSES, AND SYSTEMS FOR MANAGING NETWORK COMMUNICATIONS

CROSS-REFERENCE TO RELATED APPLICATION

This application claims priority to U.S. Provisional Application No. 63/154,311, filed Feb. 26, 2021, the entirety of which is in incorporated herein by reference.

BACKGROUND

In most systems, it is desirable for peripheral devices to be visible or discoverable to other devices with which they are configured to communicate. However, when peripheral devices, such as low-power devices, are visible to other devices with which the low-power devices are not configured to communicate, responding to unnecessary discovery probes and additional requests wastes resources such as battery power of the low-power devices. Thus, a new method of reducing power consumption is needed.

SUMMARY

It is to be understood that both the following general description and the following detailed description are exemplary and explanatory only and are not restrictive. Methods, apparatuses, and systems for wireless communication are described. A peripheral device may broadcast a connection configuration. For example, the connection configuration may indicate the peripheral device is not configured for communication. However, a network device may determine, based on an identifier associated with the peripheral device that, despite the peripheral device indicating it is not configured for communication, it is configured for communication and may send a message to the peripheral device.

BRIEF DESCRIPTION OF THE DRAWINGS

The accompanying drawings, which are incorporated in and constitute a part of this specification, show examples and together with the description, serve to explain the principles of the methods, apparatuses, and systems.

DETAILED DESCRIPTION

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions. This detailed description may refer to a given entity performing some action. It should be understood that this language may in some cases mean that a system (e.g., a computer) owned and/or controlled by the given entity is actually performing the action.

Methods, apparatuses, and systems for wireless communication are described. A plurality of computing devices may communicate via a low-energy communication protocol, such as or similar to a ZigBee network, a Z-wave network, a Bluetooth™ network, etc. The plurality of computing device may comprise one or more peripheral devices, one or more network devices, one or more user devices, and a computing device. The one or more peripheral devices may each send data (e.g., a packet of data, a beacon, etc.) that may be received by/via the one or more network devices or the one or more user devices of a wireless communication network (e.g., network access points). The one or more network devices may communicate via the low-energy communication protocol used by the peripheral devices. The one or more network devices may communicate with the one or more user devices and/or the computing device, such as set-top boxes, mobile devices, tablets, etc., using another communication protocol, such as, for example, Wi-Fi, mobile communications networks, radio frequency, a combination thereof, and/or the like.

Figure 1:
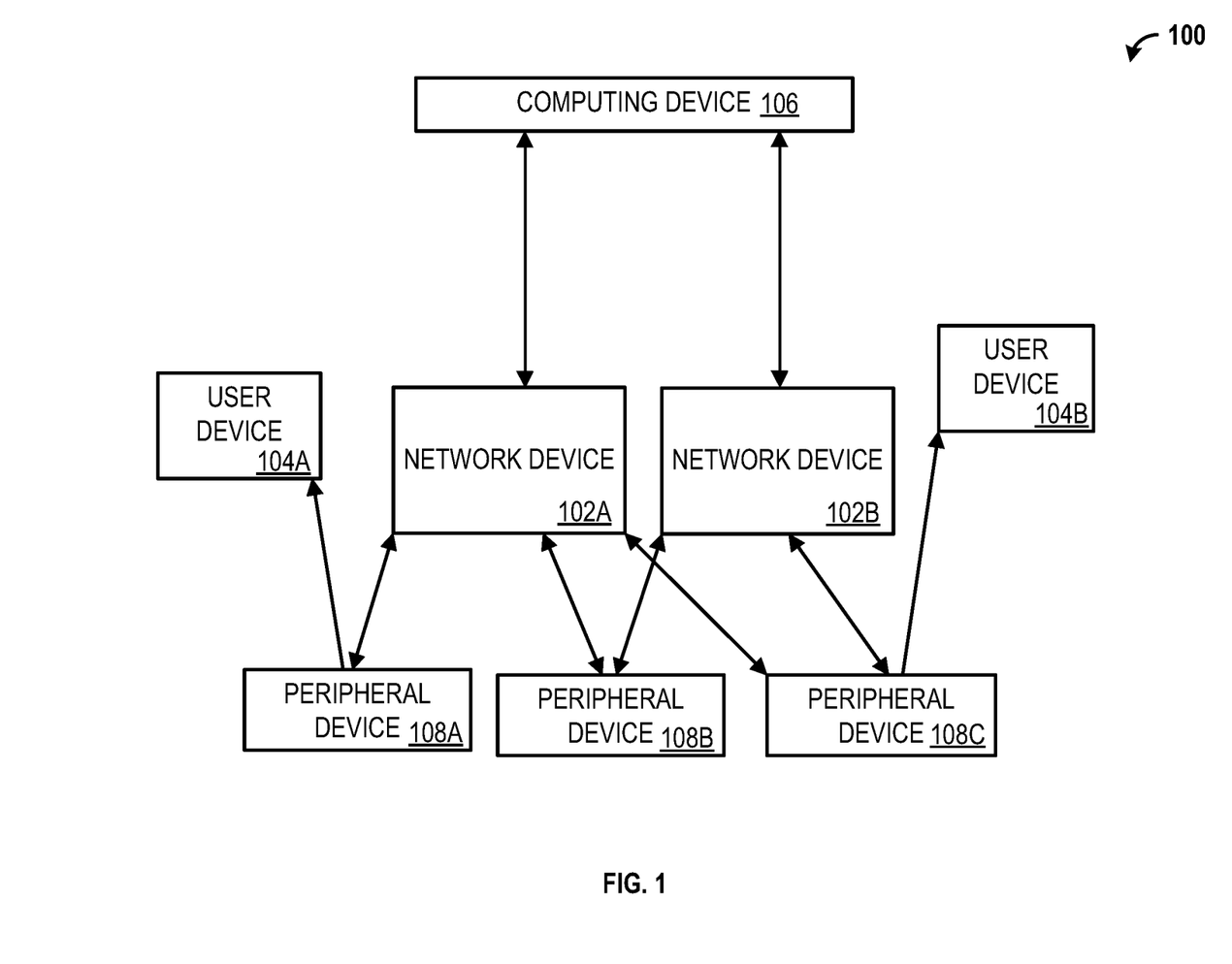
FIG. 1 shows an example system for wireless communication.

FIG. 1 shows a system 100 for wireless communication. Those skilled in the art will appreciate that digital equipment and/or analog equipment may be employed. Those skilled in the art will appreciate that provided herein is a functional description and that the respective functions may be performed by software, hardware, or a combination of software and hardware.

The system 100 may comprise one or more network devices 102A-B, one or more user devices 104A-B, a computing device 106, and one or more peripheral devices 108A-C. The one or more peripheral devices 108A-C may be mobile devices configured to utilize a low-energy communication protocol such as, for example, a ZigBee network, a Z-Wave network, a Bluetooth™ network, a combination thereof, and/or the like. The one or more peripheral devices 108A-C may each comprise a low powered electronic device such as a radio frequency identifier (RFID) enabled device, a sensor (e.g., an accelerometer and/or a temperature sensor), a smart device, a security system, an electronic camera, a smart doorbell, a Bluetooth™ device, a ZigBee device, a Z-Wave device, a Low Power Wide Area Network (LPWAN) device, combinations thereof, and/or the like. The one or more peripheral devices 108A-C may utilize, e.g., the WPAN network or the LPWAN network to communicate with the network devices 102A-B. The one or more peripheral devices 108A-C may provide one or more communication characteristics of the peripheral devices 108A-C to the network devices 102A-B. The communication characteristics may be, for example, a Link Quality Indicator (LQI), a Relative Received Signal Strength Indicator (RSSI), a Packet Error Rate (PER), combinations thereof, and/or the like.

The one or more peripheral devices 108A-C may provide the one or more communication characteristics of the peripheral devices 108A-C to the network devices 102A-B on an ad-hoc basis. The one or more peripheral devices 108A-C may operate in a broadcast mode. The broadcast mode may comprise a state of operation wherein the one or more peripheral devices is configured to send data. The one or more peripheral devices 108A-C may send data that may be received by/via one or more of the network devices 102A-B and/or the user devices 104A-B. The data may comprise, for example, a packet, a beacon, a combination thereof, and/or the like. For example, the data may comprise a message. The message may comprise a discovery beacon. The message may comprise a peripheral device identifier. For example, the peripheral device identifier may comprise an organizationally unique identifier (OUI). The message may comprise message content. The message content may comprise one more fields, one or more payloads, combinations thereof, and the like. For example, a first field of the one or more fields may indicate the peripheral device identifier while a second field of the one or more fields may indicate a connection configuration indicator. For example, the connection configuration indicator may indicate the one or more peripheral devices are not configured to communication. For example, the configuration indicator may indicate ADV_NONCONN_IND, thereby indicating the device is configured as non-connectable, non-scannable, undirected. The configuration indicator may be in a protocol data unit (PDU) field.

The one or more peripheral devices 108A-C, may each send the discovery beacon periodically (e.g., on an interval). For example, the peripheral device 108A may send the discovery beacon every 5 seconds. For example, the peripheral device 108A may send the discovery beacon on all three channels. The discovery beacon may indicate the connection configuration associated with the one or more peripheral devices 108A-C. For example, the discovery beacon may indicate that the one or more peripheral devices 108A-C is not configured for communication (e.g., the one or more peripheral devices 108A-C are "not connectable") when in fact, the one or more peripheral devices 108A-C are configured for communication. The one or more payloads may comprise additional data associated with the one or more peripheral devices. For example, a payload of the one or more payloads may indicate a temperature, a motion indicator, or any other information. A payload of the one or more payloads may be encrypted (e.g., an encrypted payload). The encrypted payload may be configured to indicate an encrypted connection configuration. The encrypted connection configuration be the same as, or different from, the connection configuration. For example, the network device may receive, from a peripheral device of the one or more peripheral devices 108A-C, in a message, an encrypted payload. The message may comprise an identifier, a connection configuration indicator, and the encrypted payload. The connection configuration indicator may indicate the device is not configured for communication, and the network device may determine, despite the connection configuration indicator indicating the peripheral device is not configured for communication, that the peripheral device is configured for communication. However, after decrypted the encrypted payload (e.g., after determining a decrypted payload), the network device may determine the peripheral device is not configured for communication. For example, the decrypted payload may indicate the peripheral device is configured for communication.

Additionally and/or alternatively, other message attributes may indicate the connection configuration. For example, a timestamp associated with the message may indicate the connection configuration. For example, even if the connection configuration indicator indicates the peripheral device is not configured to communication, and despite the OUI indicating the peripheral device is configured for communication, the network device may determine, based on a time at the message was received, that the peripheral device is not configured for communication. For example, the peripheral device may not be configured for communication during a time period (e.g., 8 PM-8 AM, or any other time period).

The one or more peripheral devices 108A-C may also be configured to operate in a receiving (e.g., listening) mode. The receiving mode may comprise a state of operation wherein the antenna is configured to receive data. For example, after sending the discovery beacon, the one or more peripheral devices 108A-C may switch from the broadcast mode to the receiving mode. The one or more peripheral devices 108A-C may be configured to receive, for example, data from the one or more network devices 102A-B.

The one or more network devices 102A-B may each utilize one or more communication protocols. The one or more network devices 102A-B may be wireless communication devices such as, for example, wireless routers, gateways, access points, a combination thereof, and/or the like. The one or more network devices 102A-B. The one or more network devices 102A-B may also utilize Wi-Fi network and a WPAN. The one or more network devices 102A-B may communicate via a same channel (e.g., a 2.4 GHz channel). The one or more network devices 102A-B may each be configured with a first Service Set Identifier (SSID) (e.g., associated with a user network or private network) to function as a local network for a particular user or users (e.g., user devices 104A-B). The one or more network devices 102A-B may each be configured with a second SSID (e.g., associated with a public/community network or a hidden network) to function as a secondary network or redundant network for a particular user or users (e.g., user devices 104A-B). The one or more network devices 102A-B may each have two or more radio transceivers for utilizing the one or more communication protocols. The one or more network devices 102A-B may utilize a Wi-Fi communication protocol to communicate with the computing device and may utilize the low-energy communication protocol to communicate with the one or more peripheral devices. The one or more network devices 102A-B may receive (e.g., detect) the discovery beacon. The one or more network devices 102A-B may determine a message content associated with the discovery beacon.

The one or more network devices 102A-B may determine a connection configuration associated with the one or more peripheral devices 108A-C. For example, the one or more network devices 102A-B may determine that despite the connection configuration indicator indicating the one or more peripheral devices is not configured for communication, the one or more peripheral devices 108A-C are configured for communication. For example, the one or more network devices 102A-B may determine, based on the peripheral device identifier, that despite the connection configuration indicator indicating the one or more peripheral devices is not configured for communication, the one or more peripheral devices 108A-C are configured for communication.

For example, the discovery beacon may comprise a header. The header may comprise the OUI. The network device may query a database and determine that the 01U, is associated with the connection configuration. For example, the network device may determine that the one or more peripheral devices associated with the OUI, when indicating they are not configured for connection, are in fact configured for connection. For example, the one or more network devices 102A-B may determine, based on the peripheral device identifier, that despite the discovery beacon received from the one or more peripheral devices 108A-C indicating that the one or more peripheral devices 108A-C is not configured for communication, the one or more peripheral devices 108A-C is configured for communication.

The one or more network devices 102A-B may further determine a device type associated with the one or more peripheral devices 108A-C. For example, the one or more network devices 102A-B may determine, based on the peripheral device identifier, that the one or more peripheral devices 108A-C are associated with a manufacturer, a class of device, one or more sensors, combinations thereof, and the like.

The one or more network devices 102A-B may send a second message. For example, the one or more network devices 102A-B may send a second message to the one or more peripheral devices 108A-C. The one or more network devices 102A-B may send the second message to the one or more peripheral devices 108A-C based on determining that the one or more peripheral devices 108A-C are configured for communication. The second message may cause an action. For example, the action may comprise one or more of activating an antenna, activating a temperature sensors, activating a location sensor, activating a lighting element, sending or receive a third message, combinations thereof, and the like.

The one or more user devices 104A-B may each be an electronic device such as a computer, a smartphone, a laptop, a tablet, a set top box, a display device, or other device capable of communicating with the one or more network devices 102A-B. The one or more user devices 104A-B may be configured to utilize any of the low-energy communication protocols or any other telecommunications protocol. The one or more user devices 104A-B may each communicate with the one or more network devices 102A-B via a wireless communication network. The wireless communication network may be a Wi-Fi network, a low-energy communication protocol, such as a ZigBee network, a Z-Wave network, a Bluetooth™ network, a combination thereof, and/or the like. The one or more user devices 104A-B may utilize the wireless network to communicate with the one or more network devices 102A-B. The user devices 104A-B may communicate via the one or more network devices 102A-B to access a service, such as the Internet.

The one or more user devices 104A-B may receive (e.g., detect) the discovery beacon broadcast by the one or more peripheral devices 108A-C. The one or more user devices 104A-B may determine, based on the discovery beacon received from the one or more peripheral devices 108A-C indicating that the one or more peripheral devices 108A-C is not configured for communication, that the one or more peripheral devices 108A-C is not configured for communication and therefore the one or more user devices 104A-B may not attempt to communicate with the one or more peripheral devices 108A-C.

The one or more network devices 102A-B may be in communication with a computing device 106 via a wireless and/or a terrestrial communication path. The computing device 106 may monitor or receive, via/from the network devices 102A-B, multiple transmissions which may be indicative of the data received by/via each of the one or more network devices 102A-B.

The computing device 106 may monitor or receive metadata sent by some or all (e.g., each) of the network devices 102A-B as part of the multiple transmissions. The metadata sent by each of the network devices 102A-B may be received via/by the computing device 106 in tandem with the multiple transmissions. The metadata sent by one, or both, of the network devices 102A-B may be indicative of one or more network parameters associated with the network device 102A-B and/or the one or more communication characteristics of the peripheral devices 108A-C. The one or more network parameters may be, for example, a WiFi channel and utilization; a ZigBee channel and utilization; a Z-Wave channel and utilization; a Bluetooth™ utilization; a signal strength associated with one or more of the peripheral devices 108A-C; system resource utilization; a determined level of interference associated with communications between the one or more network devices 102A-B and one or more of the one or more user devices 104A-B; a determined level of interference associated with receiving data from one or more of the one or more peripheral devices 108A-C; a determined distance from one or more of the one or more peripheral devices 108A-C; combinations thereof; and/or the like.

The computing device 106 may determine (e.g., select), based on the one or more network parameters received from/via the one or more network devices 102A-B, the one or more network devices 102A-B to process additional data received by/via each of the peripheral devices 108A-C. The additional data sent by a given peripheral device of the one or more peripheral devices 108A-C may be processed by one, or both, of the one or more network devices 102A-B.

The computing device 106 may receive data from the one or more network devices. For example, the one or more network devices 102A-B may send to the computing device 106 data comprising the peripheral device identifier. For example, the one or more network devices 102A-B may send a query to the computing device 106. The query may comprise the peripheral device identifier. The computing device 106 may determine, based on the peripheral device identifier, a connection configuration associated with the one or more peripheral devices 108A-C. For example, the computing device 106 may comprise a database. The database may be stored on a mass storage device. The mass storage device may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. The database may be populated with, for example, a table. The table may comprise the peripheral device identifier. The peripheral device identifier may be one of a plurality of peripheral devices identifiers. Each peripheral device identifier of the plurality of peripheral device identifiers may be associated with a connection configuration, a device type, a device class, combinations thereof, and the like. The computing device 106 may determine, based on the peripheral device identifier received in the query, that despite the discovery beacon received from the one or more peripheral devices 108A-C indicating that the one or more peripheral devices 108A-C is not configured for communication, that the one or more peripheral devices 108A-C is configured for communication. The computing device 106 may send, to the one or more network devices 102A-B, the connection configuration, the device type, the device class, combinations thereof, and the like.

Figure 2:
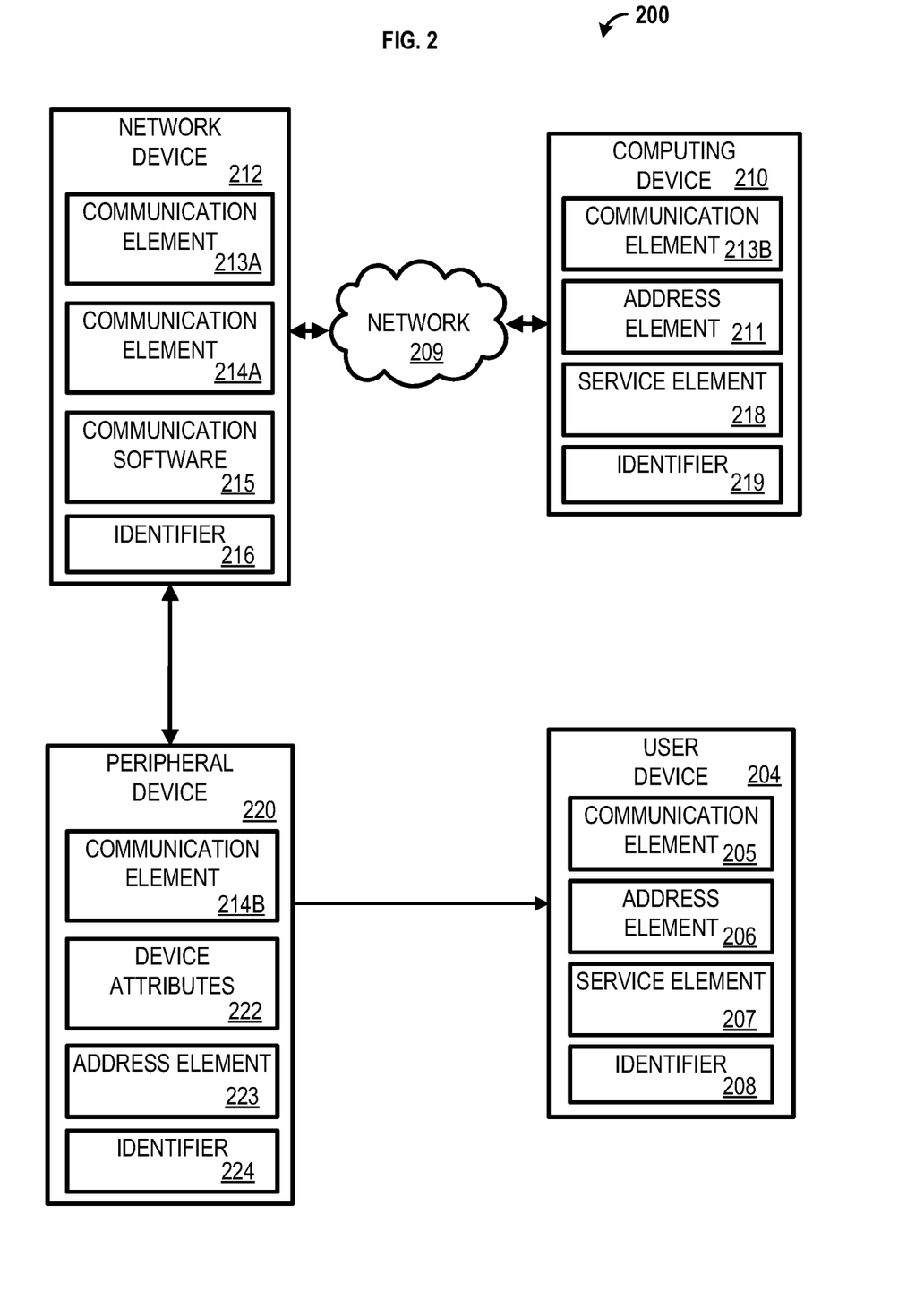
FIG. 2 shows an example system for wireless communication.

FIG. 2 shows a system 200 for wireless communication. Those skilled in the art will appreciate that digital equipment and/or analog equipment may be employed. One skilled in the art will appreciate that provided herein is a functional description and that the respective functions may be performed by software, hardware, or a combination of software and hardware.

The system 200 may include a peripheral device 220, a network device 212, a user device 204, a network 209, and a computing device 210. The network device 212 may be, for example, the one or more network devices 102A-B of FIG. 1. The peripheral device 220 may be, for example, the one or more peripheral devices 108A-C of FIG. 1. The user devices 204 may be, for example, one or more user devices 104A-B of FIG. 1. The computing device 210 may be, for example, the computing device 106 of FIG. 1.

The network device 212 may receive data sent by the computing device 210. The data may be sent by the computing devices 210 using a low-energy network protocol, such as, for example, a ZigBee network protocol; a Bluetooth™ network protocol, a Z-Wave network protocol, a combination thereof, and/or the like. The network device 212 may communicate with the computing device 210 via the network 209.

The network device 212 may be configured as a local area network (LAN). The network device 212 may be a dual band wireless communication device. The network device 212 may be a gateway device for communicating with another network, such as a communication network provided by an Internet Service Provider. The network device 212 may be configured with a first service set identifier (SSID) (e.g., associated with a user network or private network) to function as a local network for a particular user or users. The network device 212 may be configured with a second service set identifier (SSID) (e.g., associated with a public/community network or a hidden network) to function as a secondary network or redundant network for connected communication devices. The network device 212 may be configured to allow one or more wireless devices to connect to a wired and/or wireless network using Wi-Fi, Bluetooth, ZigBee, Z-Wave, or any desired method or standard.

The network device 212 may have a communication element 213A, a communication element 214A, communication software 215, and an identifier 216. The communication elements 213A and 214A may comprise wireless transceivers configured to send and receive wireless communications via a wireless communication network (e.g., the network 209). The communication elements 213A and 214A may be configured to communicate via a network protocol. The communication element 213A may be a wireless transceiver configured to communicate via a Wi-Fi network, and the communication element 214A may be a wireless transceiver configured to communicate via a Wireless Personal Area Network (WPAN). The WPAN may operate using a low-energy network protocol, such as a ZigBee network protocol; a Bluetooth™ network protocol, a Z-Wave network protocol, a combination thereof, and/or the like. The network device 212 may communicate with the computing device 210 on the network 209 via the communication element 213A. The network device 212 may receive data from the peripheral device 220 via the communication element 214A.

The network device 212 may have communication software 215. The communication software 215 may be any combination of firmware, software, and/or hardware. The communication software 215 may facilitate a reception by the network device 212 of a transmission received from/via the peripheral device 220 in order to facilitate the peripheral device 220 to send data to the computing device 210 via the network device 212 and the network 209. The communication software 206 may determine one or more attributes of the peripheral device 220 (e.g., the device attributes 222). The communication software 206 may generate a routing table entry (e.g., an access control list entry stored in memory of network device 212) indicative of the identifier 224 for the peripheral device 220. The communication software 206 may generate the routing table entry based on an instruction signal. The instruction signal may be received from/via the computing device 210 via the network 209 and the communication element 214A. The instruction signal may be indicative of the identifier 224A for the peripheral device 220. The identifier 224 for the peripheral device 220 may be, for example, a Media Access Control ("MAC") address; an organizationally unique identifier (OUI); an internet protocol ("IP") address; a universal unique identifiers ("UUID"); a combination thereof; and/or the like.

The network device 212 may have an identifier 216. The identifier 216 may be or relate to, for example, an Internet Protocol (IP) Address IPV4/IPV6 or a media access control address (MAC address) or the like. The identifier 216 may be a unique identifier for facilitating wired and/or wireless communications with the network device 212. The identifier 216 may be associated with a physical location of the network device 212.

The peripheral device 220 may have a communication element 221, device attributes 222, an address element 223, and an identifier 224. The peripheral device 220 may be an electronic device such as an RFID device (e.g., an RFID tag), a sensor, smart TV, smart speakers, toys, wearable electronics, smart appliance, smart meters, security systems, or other devices capable of communicating with the network device 212. The communication element 221 may be a wireless transceiver. The communication element 221 may be configured to communicate via a specific network protocol. For example, the communication element 221 may be configured to communicate via a WPAN such as a ZigBee network, a Z-Wave network, a Bluetooth™ network, and the like. The peripheral device 220 may communicate with the network device 212 via the communication element 221.

The peripheral device 220 may have device attributes 222. The device attributes 222 may indicate one or more attributes about the peripheral device 220, such as operating characteristics of the peripheral device 220. The device attributes 222 may indicate, for example, a broadcast strength, a broadcast frequency, a Link Quality Indicator (LQI), a Relative Received Signal Strength (RSSI), a Packet Error Rate (PER), channel selection, potential bands for use by the peripheral device 220, channels the computing device 220 may avoid communicating on, a frequency of data transmission, a sleep duration, combinations thereof, and/or the like. The device attributes 222 may indicate how the peripheral device 220 operates. That is, the device attributes 222 may indicate a frequency at which the computing device 220 communicates with the network device 212. Further, the device attributes 222 may indicate a power and/or a range associated with the communication element 221.

The peripheral device 220 may have an address element 223. The address element 223 may be, for example, an internet protocol address, a network address, a media access control ("MAC") address, an Internet address, or the like. The address element 223 may be relied upon to establish a communication session between the peripheral device 220 and the network device 212 or other devices and/or networks. The address element 223 may be used as an identifier or locator of peripheral device 220. The address element 223 may be persistent for a particular network.

The peripheral device 220 may be associated with a user identifier or device identifier 224. The device identifier 224 may be any identifier, token, character, string, or the like, for differentiating one user or peripheral device (e.g., the peripheral device 220) from another user or peripheral device. The device identifier 224 may identify a user or peripheral device 220 as belonging to a particular class of users or peripheral devices. The device identifier 224 may indicate information relating to the peripheral device 220 such as a manufacturer, a model or type of device, a service provider associated with the peripheral device 220, a state of the peripheral device 220, a locator, and/or a label or a classifier. Other information may be represented by the device identifier 224.

The user device 204 may have a communication element 205, an address element 206, a service element 207, and an identifier 208. The user device 204 may be an electronic device such as a computer, a smartphone, a laptop, a tablet, a set top box, a display device, or other device capable of communicating with the network device 212. The communication element 205 may be a wireless transceiver configured to transmit and receive wireless communications via a wireless network (e.g., the network 209). The communication element 205 may be configured to communicate via one or more wireless networks. The communication element 205 may be configured to communicate via a specific network protocol. The communication element 205 may be a wireless transceiver configured to communicate via a Wi-Fi network (e.g., network 209). The user device 204 may communicate with the network device 212 on the network 209 via the communication element 205.

The user device 204 may have an address element 206 and a service element 207. The address element 206 may comprise or provide an internet protocol address, a network address, a media access control (MAC) address, an Internet address, or the like. The address element 206 may be relied upon to establish a communication session between the user device 204 and the network device 212 or other devices and/or networks. The address element 206 may be used as an identifier or locator of the user device 204. The address element 206 may be persistent for a particular network (e.g., the network 209).

The service element 207 may comprise an identification of a service provider associated with the user device 204 and/or with the class of user device 204. The class of the user device 204 may be related to a type of device, capability of device, type of service being provided, and/or a level of service. The level of service may be, for example, business class, service tier, service package a combination thereof; and/or the like. The service element 207 may comprise information relating to or provided by a communication service provider (e.g., Internet service provider) that is providing or enabling data flow such as communication services to the user device 204. The service element 207 may comprise information relating to a preferred service provider for one or more particular services relating to the user device 204. The address element 206 may be used to identify or retrieve data from/via the service element 207, or vice versa. One or more of the address element 206 or the service element 207 may be stored remotely from the user device 204. Other information may be represented by the service element 207.

The user device 204 may be associated with a user identifier or a device identifier 208. The device identifier 208 may be any identifier, token, character, string, or the like, for differentiating one user or computing device (e.g., the user device 204) from another user or computing device. The device identifier 208 may identify a user or computing device as belonging to a particular class of users or computing devices. The device identifier 208 may comprise information relating to the user device 204 such as a manufacturer, a model or type of device, a service provider associated with the user device 204, a state of the user device 204, a locator, and/or a label or classifier. Other information may be represented by the device identifier 208.

The computing device 210 may comprise a communication element 213B. The communication element 213B may be configured to communicate with communication element 213A of the network device 212. The communication elements 213B may be configured to communicate via a specific network protocol. The communication element 213B may be a wireless transceiver configured to communicate via a Wi-Fi network.

The computing device 210 may comprise an address element 211. The address element 211 may be, for example, an internet protocol address, a network address, a media access control ("MAC") address, an Internet address, or the like. The address element 211 may be relied upon to establish a communication session between the computing device 210 and the network device 212 or other devices and/or networks. The address element 211 may be used as an identifier or locator of the computing device 210. The address element 211 may be persistent for a particular network.

The computing device may comprise a service element 218. The service element 218 may comprise an identification of a service provider associated with the user device 204 and/or with the class of computing device 210. The class of the computing device 210 may be related to a type of device, capability of device, type of service being provided, and/or a level of service. The level of service may be, for example, business class, service tier, service package a combination thereof; and/or the like. The service element 218 may comprise information relating to or provided by a communication service provider (e.g., Internet service provider) that is providing or enabling data flow such as communication services to the computing device 210. The service element 218 may comprise information relating to a preferred service provider for one or more particular services relating to the computing device 210. The address element 211 may be used to identify or retrieve data from/via the service element 218, or vice versa. One or more of the address element 211 or the service element 218 may be stored remotely from the computing device 210. Other information may be represented by the service element 218.

The computing device 210 may comprise an identifier 219. The identifier 219 may be or relate to, for example, an Internet Protocol (IP) Address IPV4/IPV6 or a media access control address (MAC address) or the like. The identifier 219 may be a unique identifier for facilitating wired and/or wireless communications with the computing device 210. The identifier 216 may be associated with a physical location of the computing device 210.

Figure 3A:
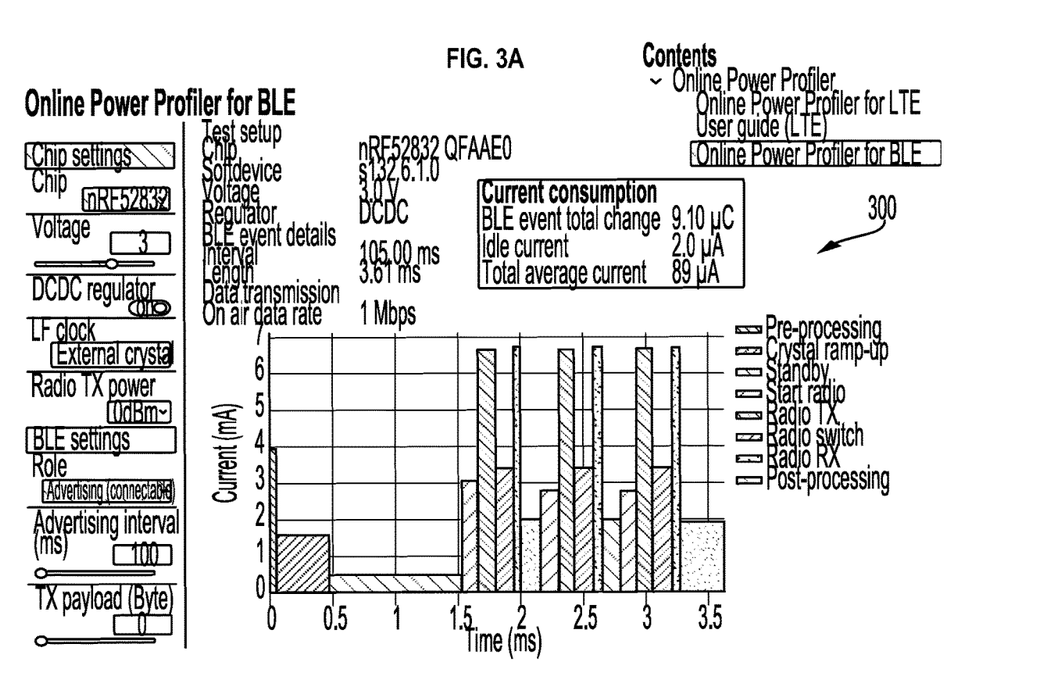
FIG. 3A shows example device operating profile.

FIG. 3A shows an example connectable peripheral device profile. The connectible peripheral device profile may comprise an operating profile wherein the peripheral device is connectable despite the discovery beacon indicating that the peripheral device is not configured for communication. The operating profile may comprise a series of operations. The connectable peripheral device profile may dictate operations of various peripheral device components. For example, the connectable peripheral device profile may dictate the operations of the various peripheral device components according to a time domain. For example, the series of operations may include a pre-processing operations. The series of operations may include a crystal ramp-up operation. The series of operations may comprise a standby operation. The series of operations may comprise a start radio operation. The start radio operation may include powering on an antenna, transceiver, combinations thereof, and the like. The series of operations may comprise a radio transmission (radio TX). The radio transmission may comprise transmitting the discovery beacon. The discovery beacon may indicate that the peripheral device is not configured for communication. For example, if a user device (e.g., a mobile phone) receives the discovery beacon, the user device may determine that the peripheral device is not configured for communication and therefore may not connect to the peripheral device. As such, the battery of the peripheral device and/or the user device may be preserved. The series of operations may comprise a radio switch operation. The radio switch operation may comprise switching the antenna from a broadcast mode to a receive mode (e.g., a listen mode). The series of operations may comprise a radio receive operation (e.g., radio RX). The radio receive operation may comprise the peripheral device receiving data. For example, a network device such as an access point associated with the OUI may receive the discovery beacon and determine, despite the indication that peripheral device is not configured for communication, that the peripheral device is in fact configured for communication (as described further herein). The network device, upon receiving the discovery beacon indicating the peripheral device is not connectable and determining, based on the message content or the peripheral device identifier or both, that the peripheral device is connectable, may send a second message to the peripheral device. The second message may be received by the peripheral device during the radio receive operation. The series of operations may further comprise a post-processing operation. For example, the post-processing operation may comprise executing an action. For example, the action may comprise one or more of activating an antenna, activating a temperature sensors, activating a location sensor, activating a lighting element, sending or receive a third message, combinations thereof, and the like.

Figure 3B:
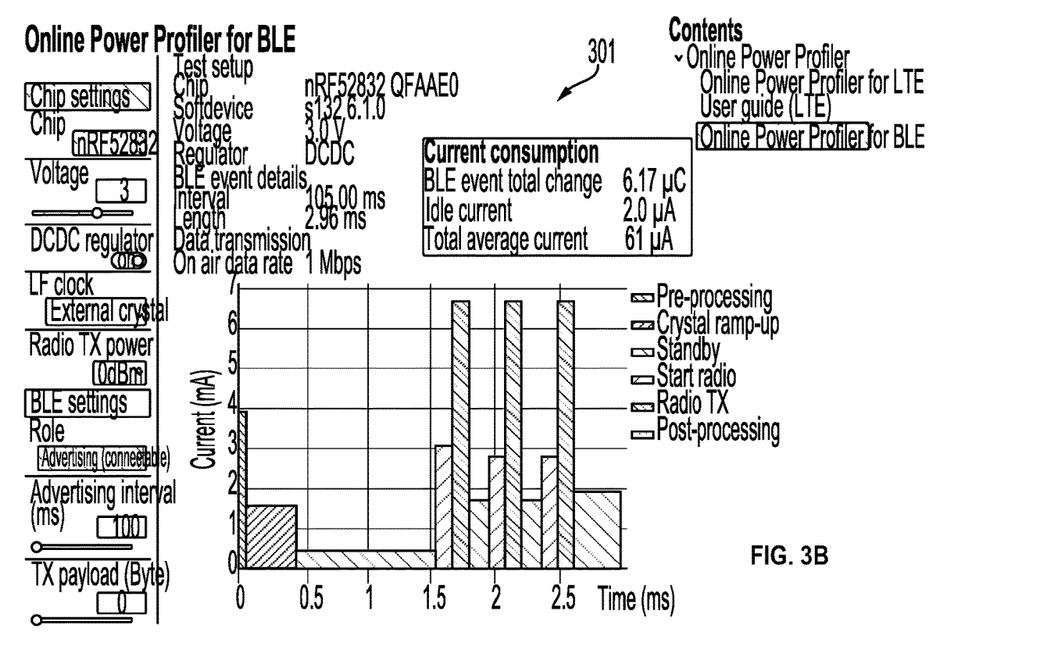
FIG. 3B shows an example device operating profile.

FIG. 3B shows an example not-connectable peripheral device profile. The not-connectible peripheral device profile may comprise an operating profile wherein the peripheral device is not connectable (e.g., not configured for communication). The operating profile may comprise a series of operations. The not-connectable peripheral device profile may dictate operations of various peripheral device components. For example, the connectable peripheral device profile may dictate the operations of the various peripheral device components according to a time domain. For example, the series of operations may include a pre-processing operations. The series of operations may include a crystal ramp-up operation. The series of operations may comprise a standby operation. The series of operations may comprise a start radio operation. The start radio operation may include powering on an antenna, transceiver, combinations thereof, and the like. The series of operations may comprise a radio transmission (radio TX). The radio transmission may comprise transmitting the discovery beacon. The discovery beacon may indicate that the peripheral device is not configured for communication. For example, if a user device (e.g., a mobile phone) receives the discovery beacon, the user device may determine that the peripheral device is not configured for communication and therefore may not connect to the peripheral device. As such, the battery of the peripheral device and/or the user device may be preserved.

Figure 4:
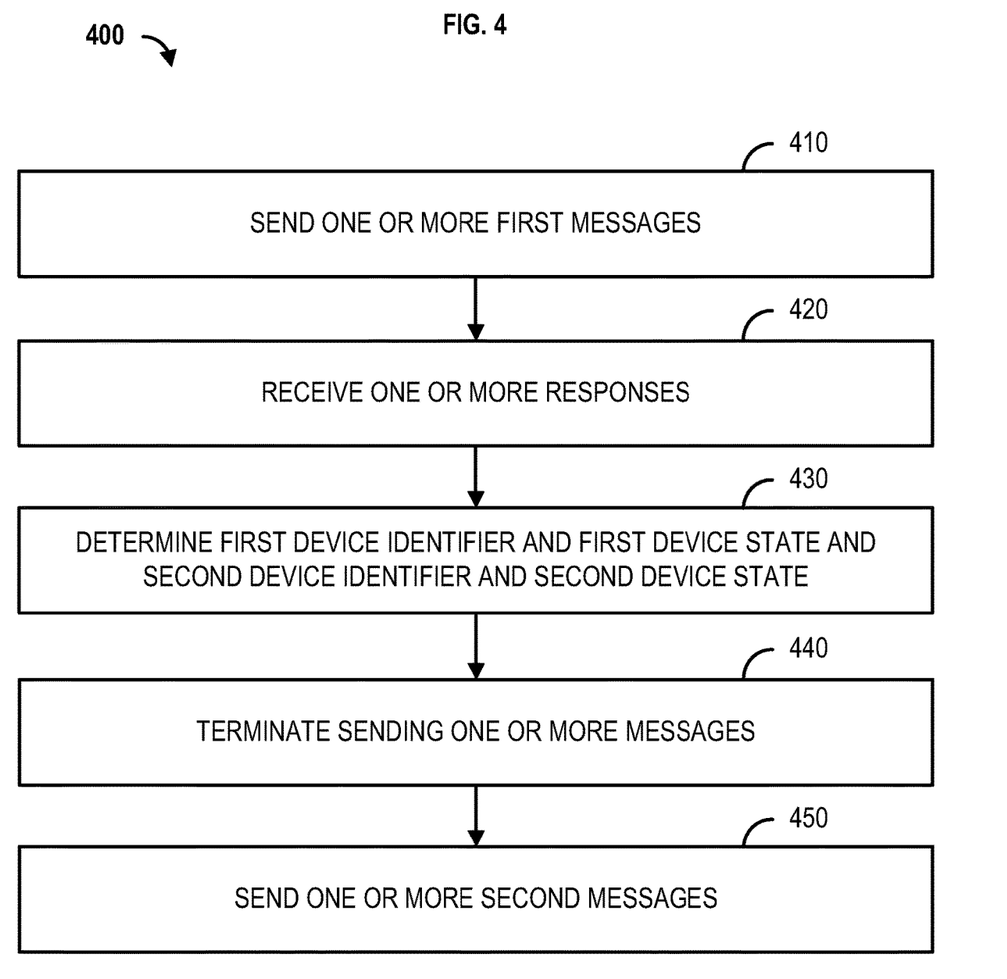
FIG. 4 shows an example method.

FIG. 4 is a flowchart of a method 400 for wireless communication. At step 410, one or more first messages may be sent. The one or more first messages may be sent by a computing device. The computing device may comprise a network device such as a gateway, an access point, combinations thereof, and the like. The one or more first messages may be sent to one or more peripheral devices. The one or more first messages may be sent repeatedly (e.g., periodically). For example, the one or more first messages may be configured to solicit one or more responses from the one or more peripheral devices. For example, the one or more first messages may be configured to cause the one or more peripheral devise to respond to the one or more first messages.

At 420, one or more responses may be received by the computing device from the one or more peripheral devices. For example, the computing device may receive a first response from a first peripheral device and a second response from a second peripheral device.

At 430, a first device identifier and a first device state associated with a first peripheral device and a second device identifier and a second device state associated with a second peripheral device may be determined. For example, the computing device may read the one or more fields and determine the first device identifier and the second device identifier. For example, the one or more responses may comprise one or more fields and/or one or more payloads. For example, a first field of the one or more fields may be a device identifier field. A second field of the one or more fields comprise one or more communication configuration indicators indicative of one or more devices states. The communication configuration indicators may indicate whether or not a given peripheral device is configured to communication (e.g., communication limited to a handshake, full communication, time-based communication, simplex communication, duplex communication, connectable, not-connectable, combinations thereof, and the like).

At 440, the computing device may terminate sending, based on the first device state and the first device identifier, the one or more messages to the first peripheral device. For example, the computing device may query data stored in a memory and determine the first device identifier is not associated with any further operations requirements.

At 450, the computing device may send, based on the second device identifier, one or more second messages. For example, the computing may determine, based on the second device identifier, that despite the second device state indicating the second device is not configured for communication, the second device is configured for communication.

The method 400 may further comprise sending, to a remote device, a query comprising one or of: the first device identifier or the second device identifier; and determining, based on one or more of the first device identifier or the second device identifier, one or more device types associated with one or more of the first peripheral device or the second peripheral device. The method 400 may further comprise causing, based on the one or more messages, the second peripheral device to at least one of: activate or deactivate an antenna, activate or deactivate a sensor, activate or deactivate a lighting element, or send a third message.

Figure 5:
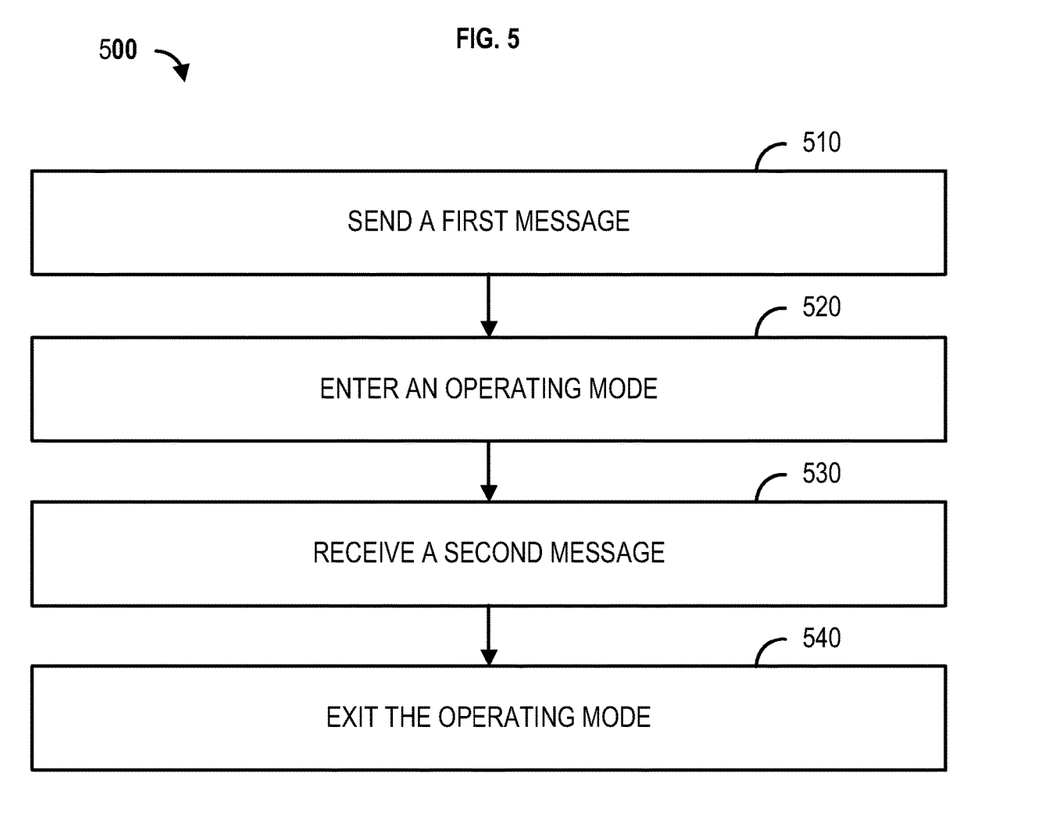
FIG. 5 shows an example method.

FIG. 5 is a flowchart of an example method 500. At 510, a first message may be sent. For example, a peripheral device may send a first message to a computing device. The first message may comprise one or more fields (e.g., one or more fields, one or more payloads, etc). The first message may comprise a device state indicator. The device state indicator may indicate a communication configuration of the peripheral device. For example, the device state indicator may indicate the peripheral device is not configured for communication. For example, a header may comprise a PDU type, a first RFU, a TxAdd field, an RxAdd field, a length field, and a second RFU. The header may comprise the OUI. For example, the message may comprise a modified and/or non-standard PDU type field. For example, the PDU type field may indicate "ADV_NONCONN_IND" which may indicate non-connectable non-scannable undirected advertising.

At 520, the peripheral device may enter an operating mode. The peripheral device may enter the operating mode based on sending the first message. For example, the peripheral device may switch from a broadcast mode to a non-broadcast mode. The non-broadcast mode may be configured to cause the peripheral device to not respond to subsequent scans. The operating mode may configure the peripheral device to listen for particular messages. The operating mode may configure the peripheral device to ignore other messages. For example, the operating mode may configure the peripheral device to only respond to messages comprising one or more device identifiers such as MAC addresses or OUI, (e.g., a range of MAC addresses or OUIs).

At 530, the peripheral device may receive a second message. For example, the second message may be sent by the computing device. The second message may comprise one or more identifiers. For example, the second message may comprise a computing device identifier associated with the computing device, an application identifier associated with one or more applications, combinations thereof, and the like.

At 540, the peripheral device may exit the operating mode. For example, the peripheral device may exit the operating mode based on receiving the second message. For example, the peripheral device may determine the one or more identifiers are associated with a different operating mode such a listen mode, a broadcast mode, a sample mode, combinations thereof, and the like.

The method 500 may comprise executing, based on receiving the second message, an action. For example, the action may comprise one or more of activating an antenna, activating a temperature sensors, activating a location sensor, activating a lighting element, sending or receive a third message, combinations thereof, and the like.

Figure 6:
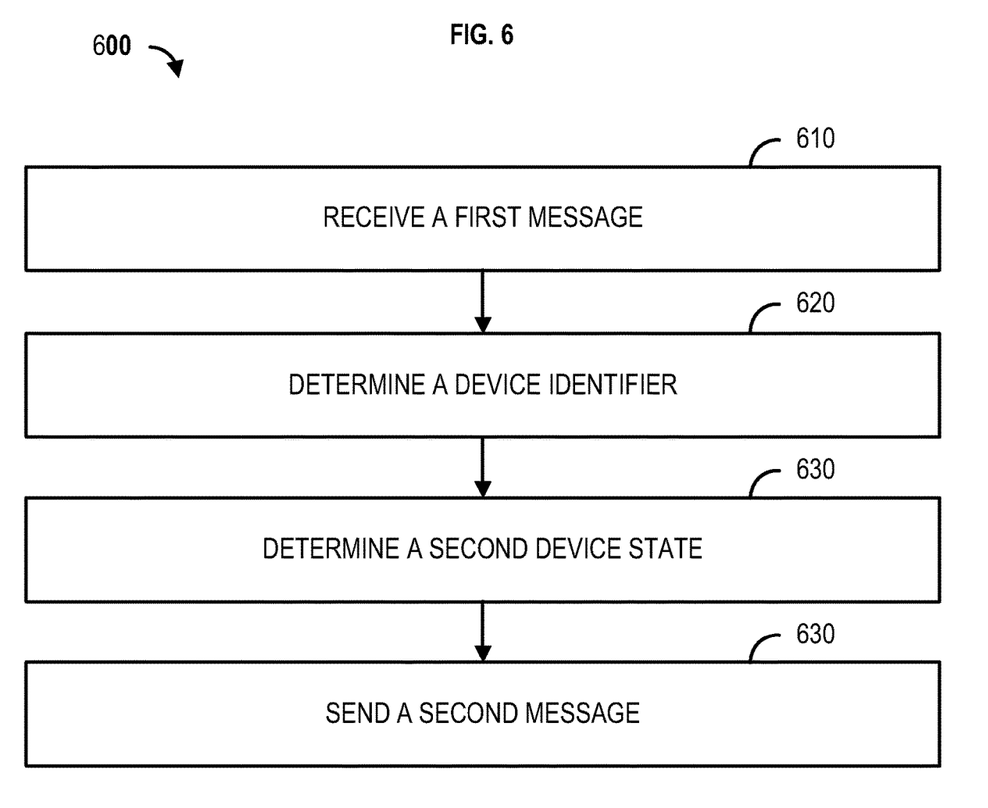
FIG. 6 shows an example method.

FIG. 6 is a flowchart of a method 600. At step 610, a first message may be received. The first message may be received by a computing device. The first message may be sent by a peripheral. The first message may comprise a low-energy communication. The first message may be received by a computing device. The computing device may comprise a network device such as an access point, a gateway, a router, combinations thereof, and the like. The computing device may operate on a low-energy communication protocol such as, for example, a ZigBee network, a Z-wave network, a Bluetooth™ network, a combination thereof, and/or the like.

The first message may be an advertising beacon sent by a peripheral device. For example, the first message may comprise a discovery beacon. A first field of the one or more fields may indicate a device state. The device state may indicate a connection configuration. For example, the first device state may indicate the one or more peripheral devices is not configured for communication (e.g., the one or more peripheral devices is "not connectable"). For example, the first message may comprise a preamble, an access address, and a packet payload. The packet payload may comprise a header. The header may comprise a PDU type, a first RFU, a TxAdd field, an RxAdd field, a length field, and a second RFU. The header may comprise the OUI. For example, the message may comprise a modified and/or non-standard PDU type field. For example, the PDU type field may indicate "ADV_NONCONN_IND" which may indicate non-connectable non-scannable undirected advertising. The first message may comprise one or more fields. The first message may comprise one or more payloads. The one or more payloads may be associated with the peripheral device. For example, the one or more payloads may comprise data gathered, generated, process, or received by the peripheral device. For example, the one or more payloads may comprise a temperature indication, a motion indication, or any other information.

At step 620, a device identifier associated with the peripheral device may be determined. For example, the first message may comprise the device identifier. For example, the device identifier may be a peripheral device identifier associated with the one or more peripheral devices. For example, the peripheral device identifier may be any identifier, token, character, string, or the like. The peripheral device identifier may identify the peripheral device as belonging to a particular class, maker, model, or organization of peripheral devices. For example, the peripheral device identifier may comprise an organizationally unique identifier (OUI). The peripheral device identifier may indicate information relating to the peripheral device such as a manufacturer, a model or type of device, a service provider associated with the peripheral device, a state of the peripheral device, a locator, and/or a label or a classifier. Other information may be represented by the peripheral device identifier. The first message may also comprise metadata. The metadata may be indicative of one or more characteristics associated with the one or more peripheral devices. The one or more characteristics may be, for example, a broadcast frequency (e.g., a number of times the peripheral device makes a broadcast), a broadcast channel, a broadcast strength, a WiFi channel and utilization; a ZigBee channel and utilization; a Z-Wave channel and utilization; a Bluetooth™ utilization, combinations thereof, and the like.

At 630, a second device state may be determined. The second device state may be determined based on the device identifier associated with the peripheral device. For example, the computing device may query a database comprising one or more device identifiers, one or more device states, one or more operations, and there associations therebetween. For example, an association may indicate that when the peripheral device associated with the device identifier indicates the peripheral device is not configured for communication, it is configured for communication.

At 640, a second message may be sent. The second message may be sent based on the peripheral device identifier. For example, the second message may be sent based on determining that the one or more peripheral devices is configured for communication. The second message may be sent, for example, from a network device to the one or more peripheral devices. The second message may cause an action. The second message may comprise an instruction. For example, the second message may comprise an instruction to modify a broadcast parameter associated with the first message. For example, the instruction may instruct the one or more peripheral devices to increase or decrease a frequency at which the one or more peripheral devices sends the first message. The second message may comprise a query. For example, the second message may comprise a request for data from the one or more peripheral devices. For example, the second message may comprise a request for a temperature, a location, or other information from the one or more peripheral devices.

The method 600 may further comprise causing an action. For example, the action may be caused based on the second status. The action may comprise one or more of activating an antenna, activating a temperature sensors, activating a location sensor, activating a lighting element, sending or receive a third message, combinations thereof, and the like. The method 600 may further comprise determining a peripheral device type based on the peripheral device identifier.

The peripheral device may change position relative to the one or more network devices. For example, a first network device may be a gateway, such as a router, and the peripheral device may be a moveable device, such as and RFID enabled device, a mobile device, sensor, computer, etc. The peripheral device may change position relative to the first network device such that the first network device no longer receives data via the peripheral device. It may be determined that the peripheral device changed position relative to the first network device based on an elapsed amount of time during which no additional data is received from the computing device via the first network device. The elapsed amount of time may be an amount of time, such as a number of seconds, minutes, hours, etc., that is less than the period of time.

Figure 7:
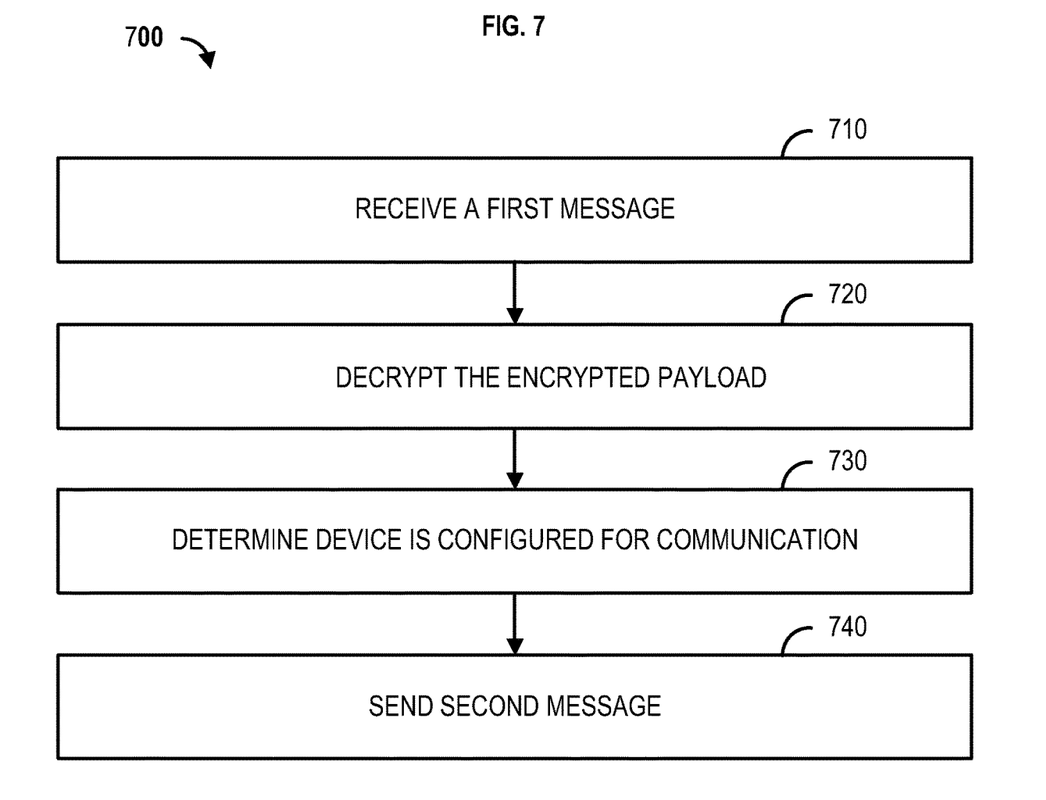
FIG. 7 shows an example method.

FIG. 7 is a flowchart of a method 700 for wireless communication. At step 710, a first message may be received. The first message may comprise a low-energy communication. The first message may be received by a computing device. For example, the first message may be received by the one or more network devices. The one or more network devices may operate on a low-energy communication protocol such as, for example, a ZigBee network, a Z-wave network, a Bluetooth™ network, a combination thereof, and/or the like. The first message may be received from one or more peripheral devices. The first message may comprise a peripheral device identifier associated with a peripheral device of the one or more peripheral devices. The peripheral device identifier may be, for example, a media access control (MAC) address, organizationally unique identifier (OUI), an internet protocol (IP) address, a universal unique identifier (UUID), a combination thereof, and/or the like. The one or more network devices may comprise an access point, a gateway, a router, combinations thereof, and the like. The first message may be an advertising beacon. For example, the first message may comprise a discovery broadcast. The first message may be sent from the one or more peripheral devices. The first message may be received more than once. For example, the one or more peripheral devices may send the first message periodically (e.g., every 5 seconds).

The peripheral device identifier may indicate information relating to the peripheral device such as a manufacturer, a model or type of device, a service provider associated with the peripheral device, a state of the peripheral device, a locator, and/or a label or a classifier. Other information may be represented by the peripheral device identifier. The first message may also comprise metadata. The metadata may be indicative of one or more parameters associated with the one or more peripheral devices and/or the one or more communication characteristics of the one or more peripheral devices. The one or more parameters may be, for example, a battery life associated with the one or more peripheral devices, a WiFi channel and utilization; a ZigBee channel and utilization; a Z-Wave channel and utilization; a Bluetooth™ utilization; a signal strength associated with one or more of the peripheral devices; system resource utilization; a determined level of interference associated with communications between the network devices and one or more of the user devices; a determined level of interference associated with receiving data from one or more of the peripheral devices; a determined distance from one or more of the peripheral devices; combinations thereof; and/or the like.

The first message may comprise one or more fields (e.g., one or more headers and/or one or more payloads). A first field of the one or more fields may indicate a communication configuration indicator of the peripheral device. For example, the communication configuration indicator may indicate the one or more peripheral devices is not configured for communication (e.g., the one or more peripheral devices is "not connectable").

The first message may comprise one or more payloads. The one or more payloads may be associated with the peripheral device. For example, the one or more payloads may comprise data gathered, generated, process, or received by the peripheral device. For example, the one or more payloads may comprise a temperature indication, a motion indication, or any other information. A payload of the one or more payloads may be encrypted, for example via an encryption key. The computing device may store a decryption key configured to decrypt the encrypted payload.

At 720, the encrypted payload may be decrypted. The encrypted payload may be decrypted based on the device identifier. For example, the computing device may, determine that messages comprising the peripheral device identifier should undergo processing such as determining an encrypted payload and decrypting the encrypted payload. For example, the computing device may determine, based on data stored in memory, that the peripheral device identifier is associated with a decryption process. For example, the memory comprise a table associating one more peripheral device identifiers with one or more processes wherein some peripheral device identifiers do not trigger decryption, and some peripheral device identifiers do trigger decryption. Additionally and/or alternatively, the computing device may be configured to decrypt encrypted payloads regardless of the peripheral device identifier.

At 730, it may be determined that the peripheral device is configured for communication. Determining that the peripheral device is configured for communication may be based on the decrypted payload. For example, the decrypted payload may indicate that, despite the communication configuration indicator indicating that the peripheral device is not configured for communication, the peripheral device is configured to communication.

At 740, a second message may be sent. For example, the computing device may send the second message to the peripheral device. The second message may be sent based on determining that the peripheral device is configured for communication.

The method 700 may further comprise causing one or more actions. For example, the one or more actions may be caused based on the second message. For example, the second message may be configured to cause the one or more actions. The second message may be configured to cause the peripheral device to execute and/or adjust one or more operations. For example, the one or more operations may comprise a broadcast frequency (e.g., the number of discovery beacons sent by the peripheral device per unit of time), a broadcast power, a broadcast channel, an operating state (e.g., turning the peripheral device on or off), a power consumption level, a sampling rate, or any other operation. The one or more actions may comprise one or more of activating or deactivating an antenna, activating or deactivating a sensor (e.g., temperature, motion, location, pressure, humidity, etc.), activating or deactivating a lighting element, sending or receiving a third message, combinations thereof, and the like. The method 700 may further comprise determining a peripheral device type based on the peripheral device identifier.

Figure 8:
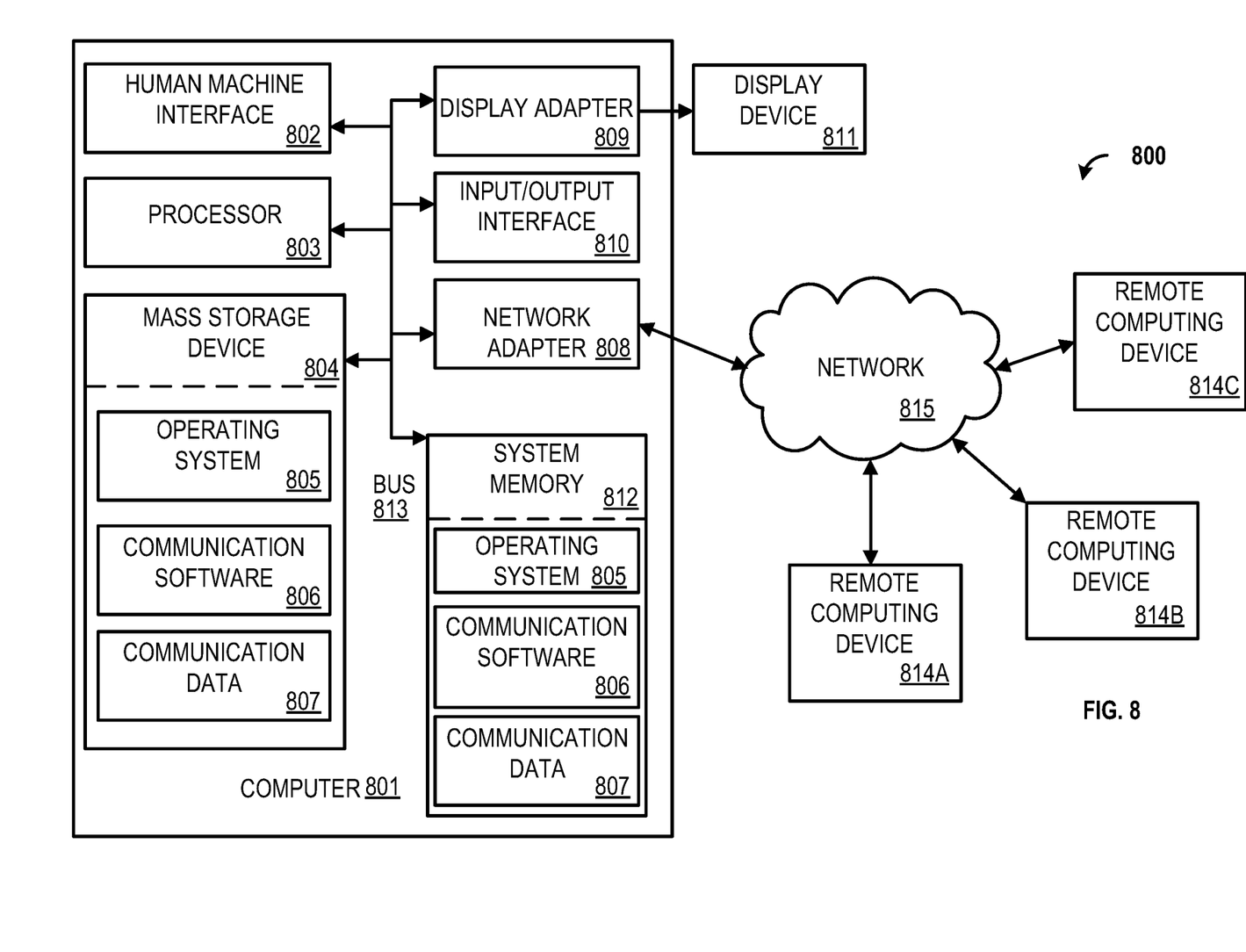
FIG. 8 shows a block diagram of an example system.

FIG. 8 shows a system 800 for wireless communication. Any of the devices shown in FIGS. 1-3, may be a computer 801 as shown in FIG. 8. The computer 801 may comprise one or more processors 803, a system memory 812, and a bus 813 that couples various system components including the one or more processors 803 to the system memory 812. In the case of multiple processors 803, the computer 801 may utilize parallel computing. The bus 813 is one or more of several possible types of bus structures, including a memory bus or memory controller, a peripheral bus, an accelerated graphics port, or local bus using any of a variety of bus architectures.

The computer 801 may operate on and/or comprise a variety of computer readable media (e.g., non-transitory). The readable media may be any available media that is accessible by the computer 801 and may include both volatile and non-volatile media, removable and non-removable media. The system memory 812 has computer readable media in the form of volatile memory, such as random access memory (RAM), and/or non-volatile memory, such as read only memory (ROM). The system memory 812 may store data such as the communication data 807 and/or program modules such as the operating system 805 and the communication software 806 that are accessible to and/or are operated on by the one or more processors 803.

The computer 801 may also have other removable/non-removable, volatile/non-volatile computer storage media. FIG. 8 shows the mass storage device 804 which may provide non-volatile storage of computer code, computer readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 804, such as the operating system 805 and the communication software 806. Each of the operating system 805 and the communication software 806 (or some combination thereof) may have elements of the program modules and the communication software 806. The communication data 807 may also be stored on the mass storage device 804. The communication data 807 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 815.

A user may enter commands and information into the computer 801 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 803 via a human machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

The display device 811 may also be connected to the bus 813 via an interface, such as the display adapter 809. It is contemplated that the computer 801 may have more than one display adapter 809 and the computer 801 may have more than one display device 811. The display device 811 may be a monitor, an LCD (Liquid Crystal Display), light emitting diode (LED) display, television, smart lens, smart glass, and/or a projector. In addition to the display device 811, other output peripheral devices may be components such as speakers (not shown) and a printer (not shown) which may be connected to the computer 801 via the Input/Output Interface 810. Any step and/or result of the methods may be output (or caused to be output) in any form to an output device. Such output may be any form of visual representation, including, but not limited to, textual, graphical, animation, audio, tactile, and the like. The display device 811 and computer 801 may be part of one device, or separate devices.

The computer 801 may operate in a networked environment using logical connections to one or more remote computing devices 814A, B, C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 801 and a remote computing device 814A, B, C may be made via a network 815, such as a local area network (LAN) and/or a general wide area network (WAN). Such network connections may be through the network adapter 808. The network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components reside at various times in different storage components of the computing device 801, and are executed by the one or more processors 803 of the computer. An implementation of the communication software 806 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   sending, by a computing device, to one or more peripheral devices, one or more messages;
   receiving, based on the one or more messages, a first response from a first peripheral device of the one or more peripheral devices and a second response from a second peripheral device of the one or more peripheral devices,
   determining, based on the first response and the second response, a first device identifier and a first device state associated with the first peripheral device and a second device identifier and a second device state associated with the second peripheral device, wherein the first device state indicates the first peripheral device is not connectable and wherein the second device state indicates the second peripheral device is not connectable;
   terminating, based on the first device state and the first device identifier, sending the one or more messages to the first peripheral device; and
   sending, based on the second device identifier, to the second peripheral device, the one or more messages.

2. The method of claim 1, wherein the one or more messages comprise one or more a discovery broadcasts.

3. The method of claim 1, wherein one or more of the first peripheral device or the second peripheral device comprises one or more of: a Bluetooth Low Energy device, or an RFID enabled device.

4. The method of claim 1, further comprising:
   sending, to a remote device, a query comprising one or more of: the first device identifier or the second device identifier; and
   determining, based on one or more of the first device identifier or the second device identifier, one or more device types associated with one or more of the first peripheral device or the second peripheral device.

5. The method of claim 1, further comprising:
   causing, based on the one or more messages, the second peripheral device to at least one of: activate or deactivate an antenna, activate or deactivate a sensor, activate or deactivate a lighting element, or send a third message.

6. The method of claim 5, wherein the third message comprises one or more of a temperature or a location.

7. A method comprising:
   sending, by a peripheral device, to a computing device, a first message comprising a peripheral device identifier and a device state indicator associated with the peripheral device;
   based on sending the first message, entering an operating mode;

receiving, based on the first message, from the computing device, a second message comprising an application identifier associated with the peripheral device identifier; and exiting, based on the application identifier, the operating mode.

8. The method of claim 7, wherein the peripheral device comprises a Bluetooth Low Energy (BLE) device.

9. The method of claim 7, wherein the device state indicator comprises one or more of a connectable indication, a non-connectable indication, a limited connection indication, or a time-based connection indication.

10. The method of claim 7, wherein the operating mode configures the peripheral device to receive the second message.

11. The method of claim 7, wherein exiting the operating mode based on the application identifier comprises determining the application identifier is associated with the peripheral device identifier.

12. The method of claim 7, further comprising executing, based on the second message, an action.

13. A method comprising:
receiving, by a computing device, from a peripheral device, a first message, wherein the first message indicates a first device state of the peripheral device;
determining, based on the first message, a device identifier associated with the peripheral device;
determining, based on the device identifier associated with the peripheral device, a second device state of the peripheral device; and
sending, based on the second device state of the peripheral device, a second message to the peripheral device.

14. The method of claim 13, wherein the computing device comprises an access point.

15. The method of claim 13, wherein the peripheral device comprises one or more of a Bluetooth enabled device or a Radio Frequency Identification (RFID) enabled device.

16. The method of claim 13, wherein the second message is a Bluetooth Low Energy (BLE) message and wherein the first message comprises a low-energy communication.

17. The method of claim 13, further comprising:
determining a timing threshold is satisfied; and
terminating, based on the timing threshold being satisfied, a communication session between the computing device and the peripheral device.

18. The method of claim 13, wherein the first device state indicates the peripheral device is not configured for communication and wherein the second device state indicates the peripheral device is configured for communication.

19. The method of claim 13, further comprising causing, based on the second device state, at least one of: activating or deactivating an antenna, activating or deactivating a sensor, activating or deactivating a lighting element, or sending a third message.

20. The method of claim 13, further comprising:
determining, based on the first message, a device identifier associated with the peripheral device; and
determining, based on the device identifier associated with the peripheral device, a device type associated with the peripheral device.

21. A method comprising:
receiving, by a computing device, a first message from a peripheral device comprising a peripheral device identifier associated with the peripheral device and an encrypted payload, wherein the first message indicates the peripheral device is not configured for communication;
decrypting, based on the peripheral device identifier, the encrypted payload;
determining, based on the decrypted payload, that the peripheral device is configured for communication; and
sending, to the peripheral device, a second message.

22. The method of claim 21, wherein the peripheral device comprises a Bluetooth Low Energy (BLE) enabled device and wherein the first message comprises a BLE communication.

23. The method of claim 21, further comprising:
determining a timing threshold is satisfied; and
terminating, based on the timing threshold being satisfied, a communication session between the computing device and the peripheral device.

24. The method of claim 21, wherein determining that the peripheral device is configured for communication comprises:
sending, to a remote device, a query comprising the peripheral device identifier; and
determining, based on the peripheral device identifier, a device type associated with the peripheral device.

25. The method of claim 21, further comprising:
determining, based on the second message, a cryptographic signature; and
causing, based on the cryptographic signature, an action, wherein the action comprises one or more of: establishing a communication session, activating or deactivating an antenna, activating or deactivating a sensor, or sending a third message.

* * * * *